(12) United States Patent
Wable et al.

(10) Patent No.: US 12,500,244 B2
(45) Date of Patent: Dec. 16, 2025

(54) MICROGRADIENT PATTERNED CARBON COATED CURRENT COLLECTOR FOR ALKALI METAL BATTERY AND METHOD OF PREPARATION THEREOF

(71) Applicants: Indian Institute of Science Education and Research, Pune (IISER Pune), Pune (IN); TCG Centres for Research and Education in Science and Technology, Kolkata (IN)

(72) Inventors: Minal Wable, Velapur (IN); Mohammad Furquan, Kanth (IN); Abhik Banerjee, Newtown (IN); Satishchandra Ogale, Pune (IN)

(73) Assignees: Indian Institute of Science Education and Research, Pune (IISER Pune), Pune (IN); TCG Centres for Research and Education in Science and Technology, Kolkata (IN)

( * ) Notice: Subject to any disclaimer, the term of this patent is extended or adjusted under 35 U.S.C. 154(b) by 499 days.

(21) Appl. No.: 18/164,750

(22) Filed: Feb. 6, 2023

(65) Prior Publication Data
US 2023/0253567 A1 Aug. 10, 2023

(30) Foreign Application Priority Data
Feb. 4, 2022 (IN) .............................. 202221006134

(51) Int. Cl.
*H01M 4/66* (2006.01)
*B05D 3/06* (2006.01)
*B23K 26/352* (2014.01)
*C23C 18/12* (2006.01)
*H01M 4/70* (2006.01)
(Continued)

(52) U.S. Cl.
CPC .............. *H01M 4/667* (2013.01); *B05D 3/06* (2013.01); *B23K 26/355* (2018.08); *C23C 18/1295* (2013.01); *H01M 4/661* (2013.01); *H01M 4/663* (2013.01); *H01M 4/70* (2013.01); *H01M 10/0525* (2013.01); *B23K 2101/36* (2018.08); *H01M 2004/021* (2013.01)

(58) Field of Classification Search
CPC ...... H01M 4/667; H01M 4/661; H01M 4/663; H01M 4/70; H01M 10/0525; H01M 2004/021; H01M 4/0404; H01M 4/133; H01M 4/1393; H01M 4/5825; H01M 4/668; H01M 10/052; B05D 3/06; B23K 26/355; B23K 2101/36; B23K 26/082; C23C 18/1295; C23C 18/1204; Y02E 60/10
See application file for complete search history.

(56) References Cited

U.S. PATENT DOCUMENTS

10,361,454 B2 * 7/2019 Goodenough ........ H01M 6/185
2017/0301922 A1 * 10/2017 Goodenough .......... H01M 4/40
(Continued)

*Primary Examiner* — Muhammad S Siddiquee
(74) *Attorney, Agent, or Firm* — Harter Secrest & Emery LLP; Michael Nicholas Vranjes (57) ABSTRACT

The present disclosure relates to in-plane modulated, microgradient-patterned (MGP) carbon-coated metal surface as a current collector (CC) for dendrite-free alkali metal plating and stripping with high coulombic efficiency and long cycle life. The specific microstructure and property of the MGP carbon coating of the present disclosure are prepared by scanned CO2 laser in-situ processing of a polymer coating.

20 Claims, 3 Drawing Sheets

(51) Int. Cl.
   *H01M 10/0525*   (2010.01)
   *B23K 101/36*   (2006.01)
   *H01M 4/02*   (2006.01)

(56) References Cited

U.S. PATENT DOCUMENTS

2018/0013170 A1* 1/2018 Goodenough .... H01M 10/0562
2018/0287222 A1* 10/2018 Goodenough ...... H01M 10/054
2022/0246896 A1* 8/2022 Locke ................. H01M 10/056

* cited by examiner

MICROGRADIENT PATTERNED CARBON COATED CURRENT COLLECTOR FOR ALKALI METAL BATTERY AND METHOD OF PREPARATION THEREOF

CROSS-REFERENCE TO RELATED APPLICATIONS

This application claims the benefit under 35 U.S.C. § 119(b) of Indian Patent Application No. 202241021884, filed on Apr. 19, 2022, which application is incorporated herein by reference in its entirety.

FIELD

The present disclosure generally relates to lithium-metal (anode-free) batteries. In particular, the present disclosure relates to in-plane modulated, microgradient-patterned (MGP) carbon-coated metal surface as a current collector (CC) for dendrite-free alkali metal plating and stripping with high coulombic efficiency and long cycle life. The specific microstructure and property of the MGP carbon coating of the present disclosure is prepared by scanned CO2 laser in-situ processing of a polymer coating.

BACKGROUND

Background description includes information that may be useful in understanding the present invention. It is not an admission that any of the information provided herein is prior art or relevant to the presently claimed invention or that any publication specifically or implicitly referenced is prior art.

Lithium-ion batteries (LIBs) are an essential part of human life, and their applications are increasing day by day, from portable electronics to electric vehicles (EVs). The LIBs play a crucial front to fight against global air pollution as widely running vehicles on the road are based on fossil fuels (Nitta, N. et al., Li-ion battery materials: present and future. *Materials Today* 2015, 18 (5), 252-264). Therefore, in the present scenario, a high energy density, safe and cheaper LIBs are urgently required to meet the market demand. Commercial Li-ion batteries have a typical energy density of less than 300 Wh kg$^{-1}$ at the cell level, which is far lesser than a current goal to achieve 500 Wh kg$^{-1}$ or higher energy density with high efficiency and a long-life span (Xie, Z. et al., Anode-free rechargeable lithium metal batteries: Progress and prospects. *Energy Storage Materials* 2020). The existing and well-established graphite-based anodes in LIBs cannot provide the required energy density because the graphite has a limited theoretical capacity (372 mAh g$^{-1}$). The commercial LIBs have reached their saturation limits; hence, elevating the LIBs from their saturation limits requires new electrochemistry ideas, designs, and battery engineering. Incorporating silicon (Si) into graphite electrodes has shown improvement in capacity. Still, many challenges arise, such as swelling and cracking due to Si extreme volume change (>300%) and rapid battery failure. Lithium metal has shown tremendous potential with a very high theoretical and achievable capacity of 3860 mAh g$^{-1}$ and has the lowest redox potential (−3.04 V vs SHE) among all other electrode materials candidates (Xu, W. et al., Lithium metal anodes for rechargeable batteries. *Energy & Environmental Science* 2014, 7 (2), 513-537). Despite having such properties, the Li-metal has a problem of an infinite volume expansion during Li plating (Initial lithium quantity on CC zero), uncontrolled dendrite formation that leads to low coulombic efficiency (CE), fire due to short circuit, and hence immediate battery failure. The above concerns have seriously limited the use of Li-metal in the commercial LIBs systems (Frenck, L. et al., Factors That Control the Formation of Dendrites and Other Morphologies on Lithium Metal Anodes. *Frontiers in Energy Research* 2019, 7). A new battery design with no extra or additional lithium metal on the negative electrode side is known as anode-free lithium batteries to harvest high energy density with safety. Here, anode free (negative electrode) has only Cu current collector (no-host, e.g., graphite) and utilizes the Li$^+$ ions stored/involved structurally in the cathode material. During charging, Li$^+$ ions are extracted from the cathode and deposited directly onto the pristine Cu current collector (CC) without any host material (e.g., graphite or graphite-silicon). The process is also known as lithium plating on the current collector. Further, during discharging, these Li$^+$ ions are stripped or removed from the CC (negative electrode side which is anode free) and intercalated back into the cathode material (Pender, J. P. et al., Electrode degradation in lithium-ion batteries. *ACS nano* 2020, 14 (2), 1243-1295). The CC thus plays a crucial role in lithium plating/stripping for anode-free lithium metal batteries. The CC has high interface energy, resulting in Li platting on the CC leading to non-uniform and inhomogeneous lithium nucleation, thereby leading to unwanted morphology growth of deposited Li, which causes significant dendrite formation. These unwanted lithium morphologies (i.e., dendrites) propagate uncontrollably to the cathode side and raise high safety concerns (i.e., short circuit and fire) (Cheng, X. B. et al., Toward Safe Lithium Metal Anode in Rechargeable Batteries: A Review. *Chemical reviews* 2017, 117 (15), 10403-10473). Therefore, the CC's textural designing and engineering and the choice of material are primary challenges to developing dendrites free morphology for anode-free lithium metal battery application. Some of the concerns and considerations mentioned herein are also applicable to other alkali metal battery systems.

Various strategies have been implemented to engineer the CC to minimize the nucleation potential and achieve high stable cycling performance. Amongst the adopted strategies in the literature are the following: a) metal-based coatings on copper CC, for example, tin metal coating, Cu$_{99}$Zn alloy coating, ultrathin Al$_2$O$_3$ coating, Cu$_3$N coating, and also developing a hierarchical type structural design of Cu CCs; b) Lithium-based coatings are also applied on the CCs in the form of lithium alloy or lithium compounds, e.g. a slurry of LiNO$_3$, including binder and conducting carbon additive, was coated onto the CC; c) In addition to transition metal and lithium coating, researchers have also used multilayer graphene coating on CC using CVD technique, ultrathin graphene oxide (GO) coating on CC using spin coating; d) Moreover, the CC is also modified with a thin layer of carbon black, including a binder for an anode-free sodium metal battery; e) the commonly used metal corrosion inhibitor benzotriazole (BTA) has also been used to coat CC by dip immersion.

Separately, widely modified/engineered CCs have adopted the concept of doping; metal/transition metal on the CC via sophisticated techniques, e.g., CVD, ALD, sputtering, which are complex to scale up due to the involvement of multi-step processing to obtain the modified CCs. Porous Cu based CCs are also prepared through an expensive and time-consuming process; for example, researchers have prepared porous Cu CCs through chemical etching of Zn metal from Cu—Zn alloy with an acid solution by stirring overnight. Another example of preparing Cu nanoneedle array via phase inversion tape casting and electrochemical deposition method followed by annealing in the argon-hydrogen mixture at a high temperature (800° C.), which is not only expensive and time-consuming but challenging to produce on a large scale. Inorganic thin layers, e.g., $Al_2O_3$ and $Cu_3N$, are not much flexible to accommodate stress during long cycling for Li metal deposition. Carbon-based nanostructures have also been applied to accommodate Li metal; however, sophisticated, and expensive template-based CVD, ALD, and sputtering methods are not cost-effective and have scalability issues. Noble metals, e.g., Pt, Ag, Au, has also been applied as an alloying material for uniform Li metal deposition, but these metals are extremely expensive for large scale applications.

Therefore, there is a need in the art to provide a microgradient-patterned (MGP) carbon-coated current collector (CC) for dendrite-free alkali metal plating and stripping with high coulombic efficiency and long cycle life.

SUMMARY

It is an object of the present disclosure to provide a microgradient-patterned (MGP) carbon-coated current collector for dendrite-free alkali metal plating with high coulombic efficiency and long cycle life.

It is another object of the present disclosure to provide a microgradient-patterned (MGP) carbon-coated current collector through a direct-write CO2 laser process.

It is another object of the present disclosure to provide a full-cell comprising of microgradient patterned-GLC coating on CC (as an anode-free negative electrode) and LiFePO4 (LFP) as cathode that gives higher performance.

In one aspect, the present disclosure provides a current collector for dendrite-free alkali metal plating characterized by a specific microgradient patterned (MGP) textural design of graphene-like carbon (GLC) and disordered carbon via a CO2 laser direct writing process.

In an embodiment of the present disclosure, the specific microgradient textural design of graphene-like carbon (GLC) is square shapes, circular, zigzag, or any patterned design that provides uniform nucleation centres for lithium plating.

In another embodiment of the present disclosure, the specific microgradient textural design of GLC plus disordered carbon patterned in the shape of multiple squares with edge length in the order of 10-800 μm.

In another embodiment of the present disclosure, edges of the MGP-GLC squares are high dense troughs with disordered carbon form, and the inner squarely areas are made of porous fluffy GLC material on a micro-scale level.

In another embodiment of the present disclosure, the MGP-GLC layer is generated through a precursor such as a furfuryl alcohol, polymer, inorganic coating, composite coatings and the like via irradiation of a CO2 laser.

In another embodiment of the present disclosure, the specific microgradient patterned-morphology-property nature of the carbon, graphitized nature of carbon, and its porosity are important factors for governing effective Li metal plating and stripping.

In another embodiment of the present disclosure, the MGP-GLC coating on CC can be tuned with the CO2 laser power and directions of the scan to reach the minimum nucleation overpotential for the lithium plating process, with the optimization parameters depending on the precursor used for coating the Cu CC before laser processing and the corresponding thickness (ex, for multiple layer case).

In another aspect, the present invention relates to a full cell comprising of patterned MGP-GLC coating on CC (as an anode-free negative electrode) and LiFePO4 (LFP) as a cathode.

In an embodiment of the present disclosure, the nucleation overpotential of the MGP-GLC modified CC (3 W-X and Y direction) is 25.4 mV.

In an embodiment of the present disclosure, the stability of the microgradient GLC patterned and engineered CC (3 W-X, and Y direction) is more than 600 cycles.

Various objects, features, aspects and advantages of the inventive subject matter will become more apparent from the following detailed description of preferred embodiments.

DETAILED DESCRIPTION

The following is a detailed description of embodiments of the present disclosure. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Unless the context requires otherwise, throughout the specification which follow, the word "comprise" and variations thereof, such as "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense, including "and/or" unless the content clearly dictates otherwise.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable.

The recitation of ranges of values herein is merely intended to serve as a shorthand method of referring individually to each separate value falling within the range. Unless otherwise indicated herein, each individual value is incorporated into the specification as if it is individually recited herein.

All processes described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

The headings and abstract of the invention provided herein are for convenience only and do not interpret the scope or meaning of the embodiments.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

It should also be appreciated that the present invention can be implemented in numerous ways, including as a system, a method or a device. In this specification, these implementations, or any other form that the invention may take, may be referred to as processes. In general, the order of the steps of the disclosed processes may be altered within the scope of the invention.

The present disclosure relates to in-plane modulated, microgradient-patterned (MGP) carbon-coated metal surface as a current collector (CC) for dendrite-free alkali metal plating and stripping with high coulombic efficiency and long cycle life.

According to the present disclosure, the inventors have demonstrated the successful application of in-plane modulated, microgradient-patterned (MGP) carbon-coated metal surface as a current collector (CC) for dendrite-free alkali metal plating and stripping with high coulombic efficiency and long cycle life. The specific microstructure and property of the MGP carbon coating used in the present disclosure are achieved by scanned $CO_2$ laser in-situ processing of a polymer coating. The developed MGP carbon primarily has a graphene-like carbon (GLC) character separated by disordered carbon form(s). The textual design of GLC on the pristine metal current collector (CC) comprises hundreds to tens of thousands of GLC squares depending on the area of CC. The regions between the square patterns are different in microstructure property as compared to the inner area of the square. The innovative textural design made of GLC has been shown to render robust dendrite-free alkali metal battery application performance. It reduces lithium nucleation barrier energy by up to 50% in comparison with the pristine CC, resulting; in four times higher dendrite free lithium plating (@0.5 mA cm-2)/stripping (@1.5 mA cm-2) capacity (600 mAh cm-2) than that of the pristine Cu foil. The micro-patterned coating with a unique microstructure property-gradient design on the CC comprises an electronegative oxygen atom; incorporated spontaneously at the CC interface providing lithiophilic centers for homogeneous lithium nucleation; hence renders stable performance over a long battery life cycle.

In an embodiment, the present disclosure relates to a current collector characterized by a specific microgradient patterned (MGP) textural design of graphene-like carbon (GLC) and disordered carbon via a $CO_2$ laser direct writing process; wherein the micro-patterned coating with a unique microstructure property-gradient design on the CC comprises an electronegative oxygen atom.

In another embodiment of the present disclosure, the specific design of MGP-GLC coating comprised of GLC and disordered carbon is produced directly onto the Cu current collector.

In another embodiment of the present disclosure, the microgradient patterned (MGP) textural design of graphene-like carbon (GLC) and disordered carbon coating on the current collector is highly robust (adherent) and flexible without any additional binder/plasticizer.

In another embodiment of the present disclosure, the microgradient patterning process can be implemented at an ambient atmospheric condition and easily scaled up.

In another embodiment of the present disclosure, the MGP-GLC layer is generated through a precursor such as a furfuryl alcohol, polymer, inorganic coating, composite coatings and the like. Preferably, the MGP-GLC layer is generated through a precursor, furfuryl alcohol.

In another embodiment of the present disclosure, the poly furfuryl alcohol (PFA)-derived MGP-GLC (GLC plus disordered carbon between GLC) coating on a metal substrate has excellent applicability in the energy storage domain. It exhibits excellent lithium metal plating/stripping behavior with much lower nucleation overpotential and longer and more stable cycle life than the pristine metal current collector (copper in the present case).

In an embodiment of the present disclosure, the adherent nature of the microgradient carbon coating (GLC plus disordered forms) on Cu CC provides mechanical stability for effective Li metal deposition for the prolonged cycle life of the electrode.

In another embodiment of the present disclosure, the MGP-GLC coating on CC can be tuned with $CO_2$ laser power and directions of the scan to reach the minimum nucleation overpotential for the lithium plating process, with the optimization parameters depending on the polymer or any other precursor used for coating the Cu CC before laser processing and the corresponding thickness.

In another embodiment of the present disclosure, the CO2 laser irradiation with speed can be varied from 1 mm/s to 100 mm/s.

In another embodiment of the present disclosure, the CO2 laser power can be varied from 0.3 W to 10 W.

According to the present disclosure, tuning of the MGP-GLC coating on CC with laser powers of 1.5 W, 3 W, and 6 W in the X and Y direction lower the overpotential to the values of 43 mV, 25.4 mV, and 33.4 mV, respectively, as compared to pristine Cu CC which has a value of 49.6 mV.

According to the present disclosure, tuning the constitution and properties of the MGP-GLC coating on CC with laser power and scan direction can enhance the cyclic stability and coulombic efficiency. For example, the patterned material on Cu CC with a laser power of 1.5 W, 3 W, and 6 W, and scanning in X and Y-direction, gives the cyclic stability of 230 cycles, 600 cycles, and 600 cycles as compared to pristine Cu CC which shows stability for 140 cycles.

In another embodiment, the present invention relates to a full cell comprising of patterned MGP-GLC coating on CC (as an anode-free negative electrode) and LiFePO4 (LFP) as cathode.

According to the present disclosure, the anode-free full cell with LFP cathode and PFA-derived patterned microgradient carbon-coated Cu CC significantly enhanced long cycle stability compared to the pristine Cu substrate/current collector.

In another embodiment of the present disclosure, the full cell of MGP-GLC coating on CC/LFP shows 71% capacity retention compared to pristine Cu-CC/LFP full-cell, which is 47% over the 100 cycles.

In another embodiment of the present disclosure, the full cell comprises electrolyte ranging from 70 uL-150 uL.

Examples

Fabrication and Characterization Techniques:

CO2 laser (Mehta Cad Cam Systems Pvt. Ltd, Erica-30 model, 30 Watts) was used for patterning the special carbon coating onto the Cu CC using Poly-Furfuryl alcohol (PFA). The laser was operated in continuous mode with a 10.6 μm wavelength. The coin cell (2032) was assembled in MBRAUN UNILAB glove box in an argon atmosphere (O2<0.1 ppm, H2O<0.01 ppm). Electrochemical cell testing was performed using a multi-channel BTS-Neware battery tester. The electrochemical coin cells were tested at a constant temperature of 27±0.2° C.

Preparation of MGP-GLC Coating onto the Metal (Cu) Current Collector

Figure 6:
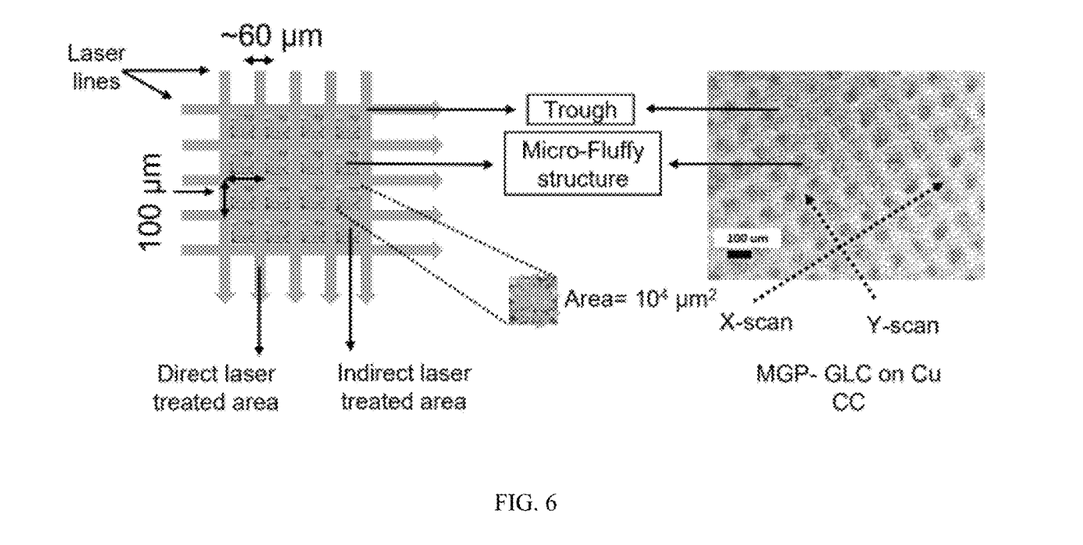
FIG. 6 represents schematics for laser micro-patterning on polymer (PFA) coating to produce MGP-GLC coating on Cu current collector and its SEM image.

The MGP-GLC coating (GLC plus disordered carbon forms) on Cu current collector (CC) was obtained using furfuryl alcohol (FA) as a precursor pre-coated on a current Cu collector. The furfuryl alcohol was cast on Cu foil and heated at 120° C. for 5 hrs. A solid brown shining film on the Cu CC was formed. Further, the coated Cu CC was irradiated by a CO2 laser beam in a specific manner along the X and Y directions to get desired MGP-GLC coating (GLC plus disordered carbon forms) on the Cu CC. The schematics for laser micro-patterning on polymer (PFA) coating to produce MGP-GLC coating on Cu current collector and its SEM image are shown in FIG. 6.

Electrochemical Cell Preparation and Testing Protocol:

The prepared MGP-GLC coated (GLC plus disordered carbon forms) current collector was punched into circular disks of 14 mm diameter for use as anode-free (i.e., negative electrode) Li (alkali metal) metal battery applications. The electrochemical performance of the said special coating on Cu CC was tested for lithium plating/stripping cycling efficiency. The coin cell (2032) assembly consists of a positive-negative case, separator, and two 16 mm discs with a thickness of 1 mm. The lithium metal was used as a reference electrode against the working electrode represented by the MGP-GLC coating (GLC plus disordered carbon forms) on Cu, separated by a polypropylene separator. Pristine Cu CC (i.e., without any carbon coating) was also separately used as a working electrode for comparison with our designed special carbon-coated CC.

An ether-based electrolyte was used, which was comprised of 1M lithium bis (trifluoromethanesulfonyl) imide (LiTFSI) salt in a mixture of 1,3-dioxolane (DOL) and 1,2-dimethoxyethane (DME) with 2 wt. % of lithium nitrate (LiNO3) as an additive. For half-cell fabrication and electrochemical testing, the lithium metal (i.e., reference electrode), working electrode (i.e., Cu CC or special carbon-coated Cu CC, anode-free electrode), and a separator were punched into the diameter of 10 mm, 14 mm, and 19 mm, respectively. The amount of electrolyte used was 120-150 μL. For testing the reproducibility of results, three cells representing each condition were fabricated and tested. The plating cycling was done at the rate of 0.5 mA cm-2 with a fixed capacity of 1 mAh cm-2, and the stripping cycling was done at the rate of 1.5 mA cm-2 (with 0.5 mA cm-2 for the initial two cycles) with a cut off voltage of 1V.

The LiFePO4 (LFP) cathode electrode was prepared for full-cell testing through the conventional slurry preparation method and the casting of the cathode material coating onto the Al foil (current collector). The slurry was prepared using the ratio of LFP:Super P:polyvinylidene fluoride (PVDF) in 8:1:1. The slurry was prepared in the NMP solvent in the mortar-pestle and cast onto the Al-foil using a doctor blade followed by 120° C. drying in the oven for 12 h. The weight loading of the LFP cathode was kept around 5-10 mg cm-1. The Cu/LFP and MGP-GLC special CC (laser power of 3 W, X and Y direction scan)/LFP cells were cycled at the rate of C/10, C/5, and C/2 for the initial five cycles for both cases, followed by further cycling at the rate of 1 C. The cells were cycled between the voltage window range of 2.5 V-3.4 V.

Results and Discussion for Patterned GLC Cu and Pristine Cu: Electrochemical Performance:

As stated above, to examine the efficacy of stated special carbon coating deposited Cu foil for lithium cycling efficiency and its comparison with uncoated Cu foil, coin cells were assembled using pristine Cu, and microgradient patterning of carbon coating modified Cu CCs against lithium metal.

Figure 1:
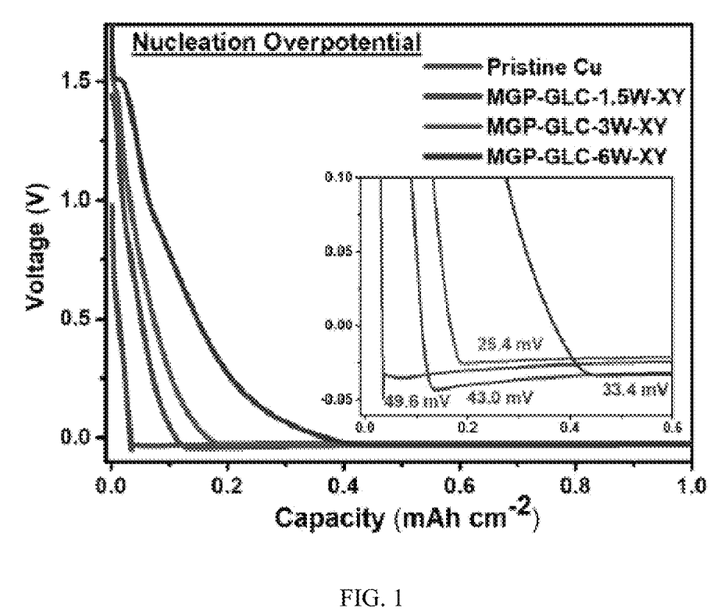
FIG. 1 is the nucleation overpotential curves during lithium plating at 0.5 mA cm-2 of pristine Cu and MGP-GLC coating modified CC, with the C-coating of CC obtained at different values of laser power.

The nucleation overpotential is an important parameter determining the density and uniformity of the lithium deposition on the CC. The nucleation overpotential of pristine Cu CC is found to be around ~50 mV. For the case of microgradient coated carbon-coated CC processed on PFA with laser power of 1.5 W-XY (double directional scans) is found to be ~43 mV; while for processing at 3 W-XY, it reduces to 25 mV. Further increase in power to 6 W leads to an increase in the nucleation overpotential to ~34 mV (FIG. 1), suggesting an optimum for laser parameters to give the lowest nucleation potential. It is observed that as the graphene character increases, the nucleation overpotential decreases. The lower nucleation over-potential observed for GLC coated Cu can therefore be directly attributed to the lithiophilic nature of the MGP-GLC form.

Figure 2:
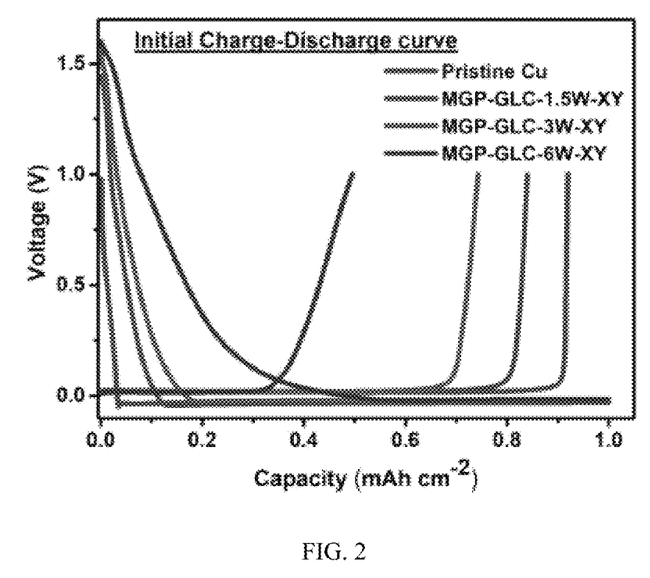
FIG. 2 is the first cycle charge-discharge (platting-stripping) curves of pristine Cu and MGP-GLC coating CC, with the C-coating of CC obtained at different values of laser power to examine the first cycle CE loss.
Figure 3:
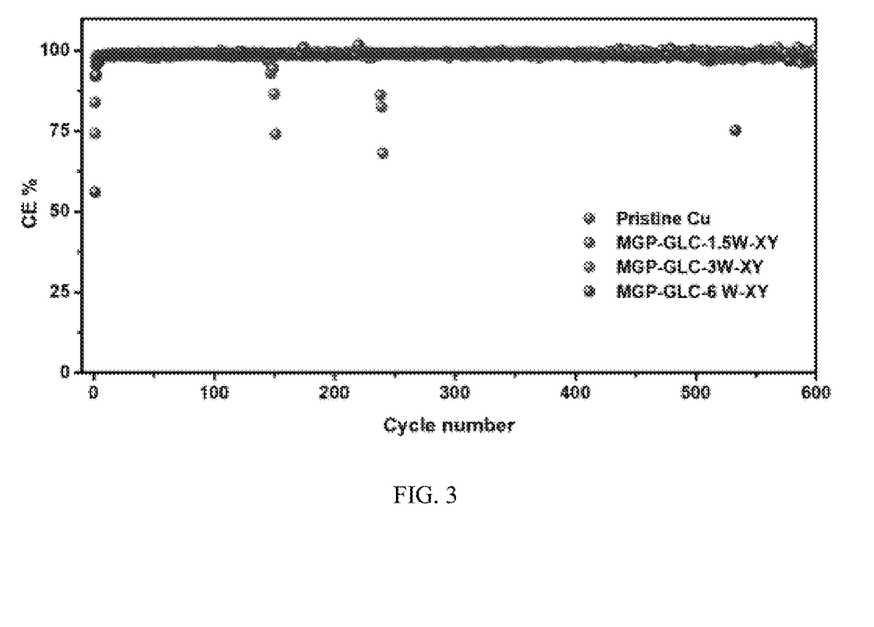
FIG. 3 is the cycling stability, and coulombic efficiency (CE) of pristine Cu and MGP-GLC coated Cu, with the C-coating of CC obtained at different values of laser power.

The first cycle Coulombic efficiency (CE) loss is due to SEI layer formation, electrolyte degradation, dead lithium formation, and irreversible lithium intercalation with the surface coating. The first cycle CE loss with pristine Cu electrode is 92%, that for MGP-GLC coated CC processed at 1.5 W-XY is 84%; the one processed at 3 W-XY is 74%, and that processed at 6 W W-XY is 56% (FIG. 2). With an increase in laser power, the first cycle CE loss increases, and it does not follow the trend of the quantity of the graphene-like character in the coating. Moreover, the 3 W-XY processed case shows the best performance with stability for over 600 cycles, as compared to the pristine Cu CC, which is stable only for 140 cycles (FIG. 3). The CE of the 6 W-XY processed case is stable up to 600 cycles; however, the initial cycle CE (~56%) is far lesser than the 3 W-XY processed case (initial CE~74%). Its nucleation overpotential is also more (33.4 mV) in comparison with the 3 W-XY case. Thus, the cell with 3 W-XY processed microgradient pattern carbon coating on CC attains not only lower over-potential but also a far better cyclic performance as compared to pristine Cu.

Figure 4:
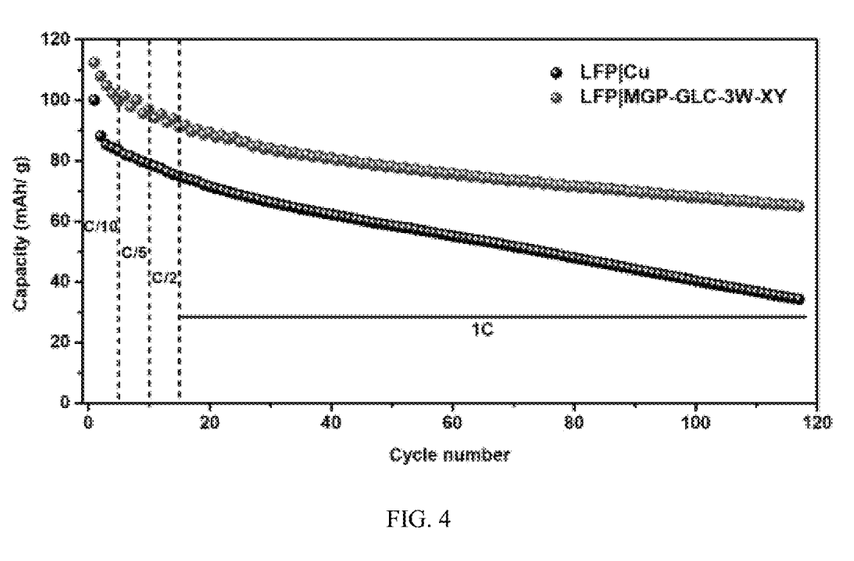
FIG. 4 is the comparison of anode-free full cell performance with LiFePO4 (LFP) as cathode and anode-free current collector as pristine Cu foil and 3 W-XY processed MGP-GLC coated CC electrode cycled at different rates of C/10, C/5, C/2 and 1 C.
Figure 5:
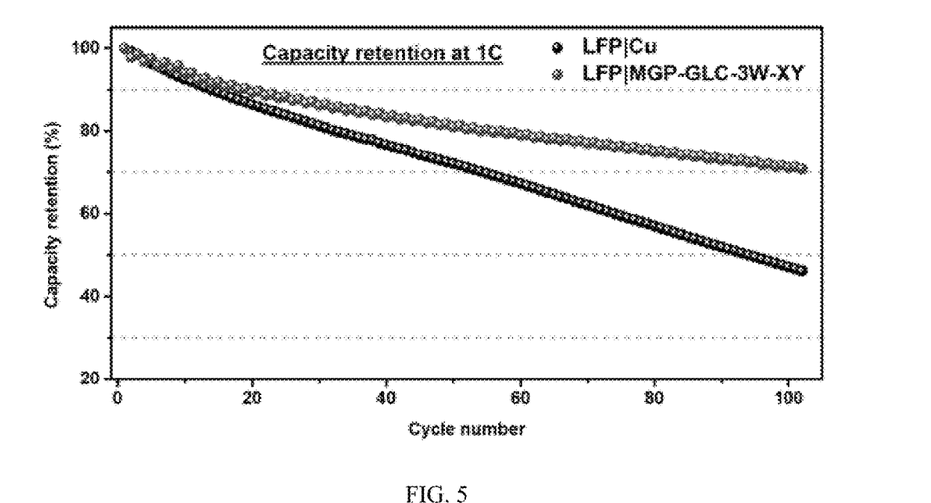
FIG. 5 is the retention of specific capacity of Cu/LFP, and MGP-GLC coating with 3 W-XY/LFP normalized to the first cycle at 1 C rate.

The effect of the MGP-GLC coating on the Li cycling performance was further examined using LiFePO4 (LFP) as a cathode. The current density was kept for C/10, C/5, C/2 each for five cycles and further at 1 C for the remaining cycles (FIG. 4). The difference in the capacity retention between the Cu/LFP cell and our C-coated CC/LFP cells, shown in FIG. 5, evidently indicates a significant positive effect of the microgradient patterned coating layer on Cu CC on Li cycling. The capacity retention of Cu/LFP is ~47%, and our C-coated/LFP is ~71% after the 100th cycle (FIG. 5).

Advantages of the Present Disclosure

The present disclosure provides a microgradient-patterned (MGP) carbon-coated current collector having high coulombic efficiency and long cycle life.

The present disclosure provides a microgradient-patterned (MGP) carbon-coated current collector that assists the uniform Li-ion diffusion, results in homogeneous lithium nucleation, lowers the nucleation potential energy, and suppress the dendritic formation and inactive (dead) lithium.

The present disclosure provides a microgradient-patterned (MGP) carbon-coated current collector that facilitates uniform lithium nucleation during the plating process and significantly reduces the nucleation potential (up to 50%).

The present disclosure provides a full cell with microgradient-patterned (MGP) carbon-coated current collector that gives higher performance.

A skilled artisan will appreciate that the quantity and type of each ingredient can be used in different combinations or singly. All such variations and combinations would be falling within the scope of the present disclosure.

The foregoing examples are merely illustrative and are not to be taken as limitations upon the scope of the invention. Various changes and modifications to the disclosed embodiments will be apparent to those skilled in the art. Such changes and modifications may be made without departing from the scope of the invention.

What is claimed is:

1. A current collector for dendrite-free alkali metal plating, said current collector comprises:
   a textural design comprising a micro-gradient patterned (MGP) textural design of graphene-like carbon (GLC) layer separated by disordered carbon between GLC (MGP-GLC) layer,
   wherein, the MGP-GLC comprises an electronegative oxygen atom incorporated spontaneously at the CC interface providing lithiophilic centers for homogeneous alkali nucleation rendering stable performance over a long battery life cycle.

2. The current collector as claimed in claim 1, wherein the textural design is square shape, circular shape, zigzag shape, or a patterned design that provides uniform nucleation centres for lithium plating.

3. The current collector as claimed in claim 1, wherein the textural design is patterned in the shape of multiple squares with edge length in the order of 10-800 µm.

4. The current collector as claimed in claim 3, wherein the edges of the MGP-GLC squares are high dense troughs with disordered carbon form, and the inner squarely areas are made of porous fluffy GLC material on a micro-scale level.

5. The current collector as claimed in claim 1, wherein the nucleation overpotential of the current collector is less than 43 mV.

6. The current collector as claimed in claim 1, wherein current collector is made of copper.

7. A process for fabricating MGP-GLC layer on multiple substrate types using CO2 laser-induced photothermal pyrolysis, said process comprises the steps of:
   a. casting a GLC precursor on a substrate to obtain a casted substrate;
   b. heating the casted substrate at a temperature in a range of 75 deg C. to 150 deg C. to obtain a polymerized GLC film-coated substrate; and
   c. graphitizing the polymerized GLC precursor film using CO2 laser in scanning mode in X- and Y-directions to obtain the MGP-GLC layer on the substrate;
   wherein:
      said process is a low-temperature thermal polymerization process that excludes the use of any external acid catalyst, additive or any other extra step for the polymerization;
      said substrate coated with GLC precursor is directly converted into MGP-GLC layer under a CO2 laser, and
      said process is effected at normal atmospheric conditions under a CO2 laser.

8. The process as claimed in claim 7, wherein the heating is effected at a temperature of 120 deg C. in an open-air oven for 5 hrs.

9. The process as claimed in claim 7, wherein the precursor is selected from the group comprising of a furfuryl alcohol, polymer, inorganic coating, composite coatings and the like.

10. The process as claimed in claim 7, wherein the precursor is furfuryl alcohol.

11. The process as claimed in claim 7, wherein the polymerized GLC precursor film is poly furfuryl alcohol film.

12. The process as claimed in claim 7, wherein the substrate is selected from the group consisting of PET sheets, Cu foil, plastics, polymers, rubber and the like.

13. The process as claimed in claim 7, wherein the precursor is selected from the group comprising of a furfuryl alcohol, polymer, inorganic coating, composite coatings and the like.

14. The process as claimed in claim 7, wherein the MGP-GLC layer has a thickness in the range of 100 nm to 250 µm.

15. The process as claimed in claim 7, wherein the MGP-GLC layer has a thickness in the range of 20 µm to 50 µm.

16. The process as claimed in claim 7, wherein the degree of graphitization and the graphene nanostructure morphology of GLC coating layer is effected at a tuning laser power of 0.3 W to 10 W; and a scan speed of 1 mm/s-100 mm/s.

17. The substrate as claimed in claim 7, wherein said substrate is a flexible substrate for a current collector anode free battery, a supercapacitor, an anode material for Li and Na ion battery, a conductive additive, or a counter electrode for solar cell.

18. A full cell comprising the patterned MGP-GLC layer on current collector as claimed in claim 1 as an anode-free negative electrode, and LiFePO4 as a cathode.

19. The full cell as claimed in claim 15, said full cell further comprises an electrolyte ranging from 70 µL-150 µL.

20. A lithium ion battery comprising the patterned MGP-GLC layer on current collector as claimed in claim 1 as an anode-free negative electrode, LiFePO4 as a cathode, and an electrolyte.

* * * * *